(12) United States Patent
Snyder

(10) Patent No.: US 7,938,431 B1
(45) Date of Patent: May 10, 2011

(54) SWIVEL TYPE HITCH FOR ALL-TERRAIN VEHICLES AND THE LIKE

(76) Inventor: Samuel M. Snyder, Eagle River, AK (US)

( * ) Notice: Subject to any disclaimer, the term of this patent is extended or adjusted under 35 U.S.C. 154(b) by 77 days.

(21) Appl. No.: 12/386,315

(22) Filed: Apr. 16, 2009

(51) Int. Cl.
*B60D 1/00* (2006.01)
(52) U.S. Cl. ..................................... 280/494; 280/491.5
(58) Field of Classification Search .................. 280/492, 280/494, 491.5, 493
See application file for complete search history.

(56) References Cited

U.S. PATENT DOCUMENTS

| 3,730,557 | A | * | 5/1973 | Cox | 280/504 |
| 4,548,423 | A | * | 10/1985 | Craven | 280/492 |
| 4,711,461 | A | * | 12/1987 | Fromberg | 280/494 |
| 5,531,283 | A | * | 7/1996 | Austin et al. | 180/53.1 |
| 5,647,604 | A | * | 7/1997 | Russell | 280/492 |
| 5,873,229 | A | * | 2/1999 | Franet | 56/15.7 |
| 5,984,342 | A | * | 11/1999 | Ysker | 280/492 |
| 6,145,855 | A | * | 11/2000 | Bellis, Jr. | 280/32.7 |
| 7,040,645 | B1 | * | 5/2006 | Borneman et al. | 280/492 |
| 7,445,226 | B1 | * | 11/2008 | Hahne et al. | 280/493 |
| 2004/0145147 | A1 | * | 7/2004 | Asbury et al. | 280/204 |

* cited by examiner

*Primary Examiner* — Kevin Hurley
(74) *Attorney, Agent, or Firm* — Michael J. Tavella

(57) ABSTRACT

A coupling system that uses a standard receiver box found on most new vehicles to attach a coupler with a universal joint allows full movement between the vehicle and the trailer, including vertical, lateral and rotational motion. The device also incorporated lubrication fittings so that it can be lubricated in the field. The rear of the universal joint has a spindle that extends rearward. The spindle fits through a sleeve that is used to attach the unit to the trailer. The spindle is rotatable secured in the sleeve with a nut and a pin, to provide the 360 degrees of rotation. A limiter plate can be installed to limit the rotation of the trailer in use. The sleeve has two flat side plates that are bolted to the trailer tongue. The unit provides a strong, compact functional hitch system.

17 Claims, 14 Drawing Sheets

SWIVEL TYPE HITCH FOR ALL-TERRAIN VEHICLES AND THE LIKE

CROSS REFERENCE TO RELATED APPLICATIONS

Not Applicable

STATEMENT REGARDING FEDERALLY SPONSORED RESEARCH AND DEVELOPMENT

Not Applicable

BACKGROUND OF THE INVENTION

1. Field of the Invention

This invention relates to swivel hitches and particularly to swivel hitches for all-terrain vehicles utilizing universal joints.

2. Description of the Prior Art

All Terrain Vehicles (ATVs) are used by sportspersons and hunters to gain access to outdoor spaces. These vehicles are easily able to climb and descend steep slopes, cross small streams, travel over rough terrain. People often like to haul extra gear with these vehicles, using small trailers. These trailers must be hitched to the ATV. Presently, the trailers are attached using a standard ball and hitch assembly.

Ball and hitch assemblies are commonplace and are used to haul tens of thousands of trailers along the roads of the world. As simple and reliable as this hitch system is, it suffers from one major disadvantage. The ball and hitch system requires that the vehicle and trailer remain fairly level during operation. Thus, this system works best on paved roads with normal grades and banks. They can be used in campgrounds that have somewhat rougher roads, as these roads still tend to be mostly level with modest grades.

When the ball and hitch system is used off road, however, it performs poorly. There is a limit to the vertical and horizontal displacement between the vehicle and the trailer as well as limit to the amount of angular differential between them. Thus, oftentimes, trailers using ball hitches are simply unable to be used over extreme terrain.

Some implements, most notably frame implements have used universal type joints to connect them to a vehicle. Unlike the ball hitches, these connections provide wider range of motion. One such example is found in U.S. Pat. No. 4,077,234, which teaches a universal joint that is installed in a housing. The coupling device has a telescoping system to extend it out to mate with a trailer. Note, here, the trailer is fitted with a special coupling receiver to mate with the special housing on the vehicle. Thus, before use, the trailer must be modified to have the box mount for this coupler installed.

BRIEF DESCRIPTION OF THE INVENTION

The instant invention overcomes the previously discussed difficulties. It is a coupling system that uses a standard receiver box found on most new vehicles to attach the coupler to the vehicle. In cases where no such receiver is installed, an auxiliary box assembly can be placed where the hitch ball it located. On the trailer, the trailer tongue is by removing the ball hitch clamp. The instant invention is then bolted directly to the tongue of the trailer. No special modifications are needed to assemble or attach the coupler.

Once coupled, the universal joint allows full movement between the vehicle and the trailer, including vertical, lateral and rotational motion. The unit has a vertical range of 112 degrees up and down from level center as well as 112 degrees right and left of level center. It is free to rotate a full 360 degrees as well. Moreover, the design allows the trailer to be easily connected and disconnected when not needed.

The device also incorporated lubrication fittings so that it can be lubricated in the field.

The rear of the universal joint has a spindle that extends rearward. The spindle fits through a sleeve that is used to attach the unit to the trailer. The spindle is rotatable secured in the sleeve with a nut and a pin, to provide the 360 degrees of rotation. In cases where the trailer contents may spill if the trailer is turned too far, a limiter plate can be installed to limit the rotation of the trailer in use.

The sleeve has two flat side plates that are bolted to the trailer tongue.

The unit provides a strong, compact functional hitch system that allows a user to haul a trailer over the roughest terrain without difficulty, binding or strain.

DETAILED DESCRIPTION OF THE INVENTION

Figure 1:
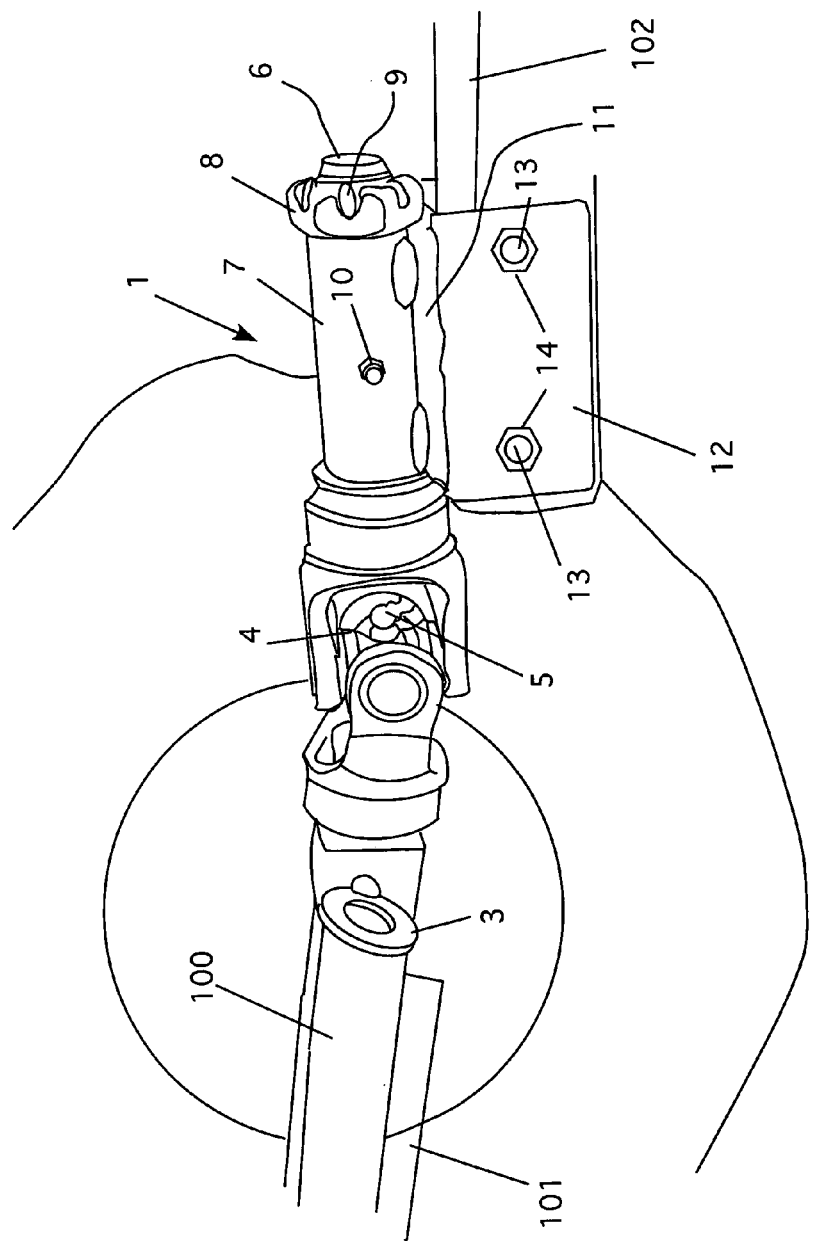
FIG. 1 is a left side view of the device mounted on a trailer and installed in a standard box receiver on an ATV.

Referring now to FIG. 1, a left side view of a first embodiment device mounted on a trailer and installed in a standard box receiver on an ATV is shown. The device 1 is installed, in the preferred embodiment, in the square box receiver 100 that is found on many vehicles today. The receiver 100 is welded to the vehicle's frame 101. The receiver has an opening to receive a hitch mount. In the prior art, such hitch mounts typically are steel bars that have one or more hitch balls secured to them. The steel bars are secured in the box receivers by a pin that is secured with a spring clip. The use of the box receiver allows for a variety of hitch configurations to be installed.

Figure 2:
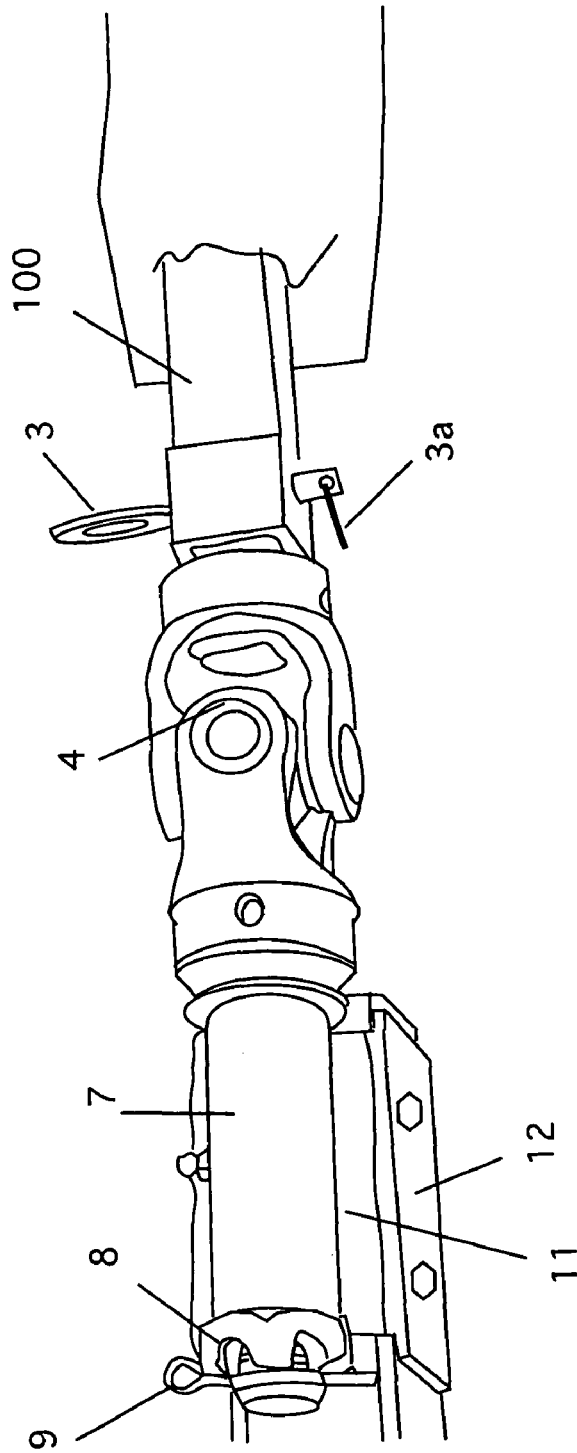
FIG. 2 is a top right side view of the device mounted on a trailer and installed in a standard box receiver on an ATV.

Here, the invention takes advantage of the box receiver by having a square shaft 2 (see, e.g., FIG. 5) that fits into the box receiver. Note that the size of the shaft can be changed to match the size of the box receiver on the vehicle. A pin 3 is inserted though both the receiver box and the shaft to hold the shaft in place. FIG. 2 shows the spring clip 3a used to secure the pin in place. The pin 3 and the spring clip 3a are considered to be a means for temporarily securing and retaining said shaft in said box hitch receiver.

Extending rearward from the square shaft is a universal joint 4. This joint is a typical joint common to the art and has a range of motion in all three axes of motion. In the vertical and horizontal planes, the joint can move 112 degrees up, down, left or right from center. The joint can also rotate about its longitudinal axis a full 360 degrees. For maintenance and convenience, a grease zerk fitting 5 is provided to allow for lubrication even in the field. Extending back from the universal joint is cylindrical spindle 6 (see e.g., FIG. 6). Note that the end of this spindle is shown in FIG. 1. The spindle fits though a sleeve 7. The spindle is secured in the sleeve by a nut 8 and pin 9. The nut 8 is considered to be a means for securing said sleeve onto said spindle. The structure allows the sleeve to rotate about the shaft independently from the coupler. It also allows the coupler to rotate independent of the sleeve. A grease fitting 10 is also provided for the sleeve. In the preferred embodiment, the shaft is a one-inch diameter spindle of heavy steel with at least a 2,000 lb rating.

The sleeve 7 is secured to a flat plate 11. Two side plates 12 are then secured to the flat plate 11 to form an open box that fits over a trailer tongue 102. The coupler is secured to the tongue by bolts 13 and nuts 14, or similar fasteners.

FIG. 2 is a top right side view of the device mounted on a trailer and installed in a standard box receiver on an ATV. In this view, the end nut 8 and pin 9 are shown more clearly. In addition, the pin 3 and spring clip 3a that are used to secure the device in the box receiver are shown more clearly.

Figure 3:
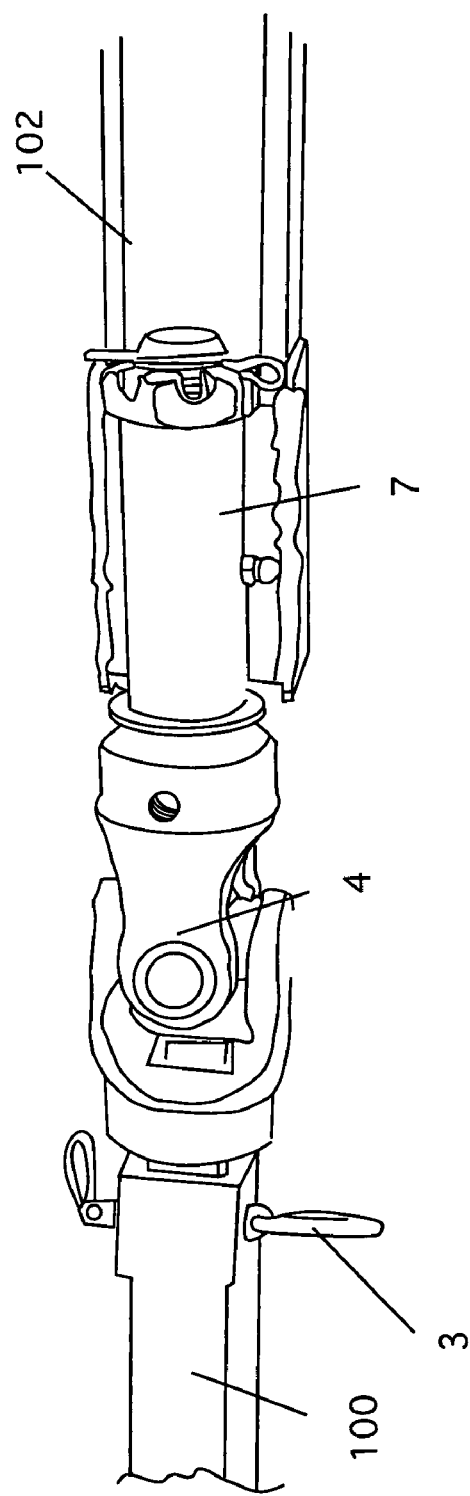
FIG. 3 is a top left side view of the device mounted on a trailer and installed in a standard box receiver on an ATV.

FIG. 3 is a top left side view of the device mounted on a trailer and installed in a standard box receiver on an ATV. As before, the sleeve 7, the pin 3 and spring clip 3a are shown more clearly.

Figure 4:
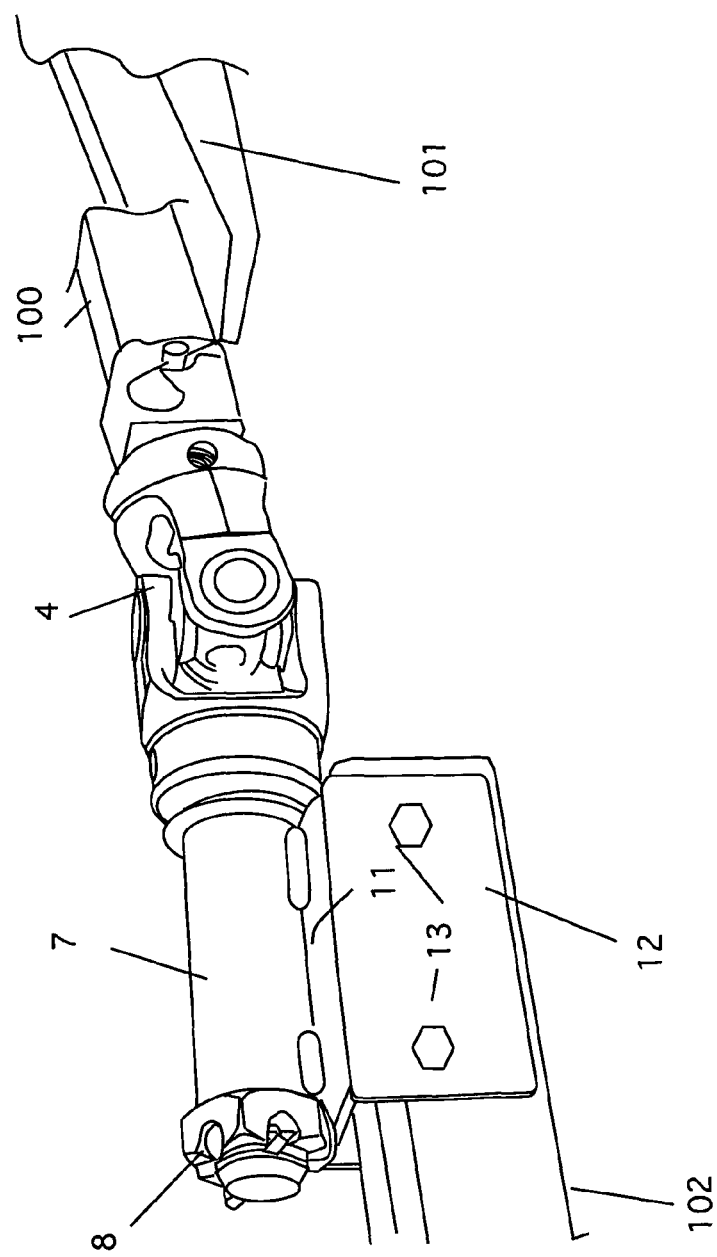
FIG. 4 is a right side view of the device mounted on a trailer and installed in a standard box receiver on an ATV.

FIG. 4 is a right side view of the device mounted on a trailer and installed in a standard box receiver on an ATV. Here, the frame 101 is shown supporting the box receiver 100. Note also, this view illustrates some of the vertical angularity available from the unit.

Figure 5:
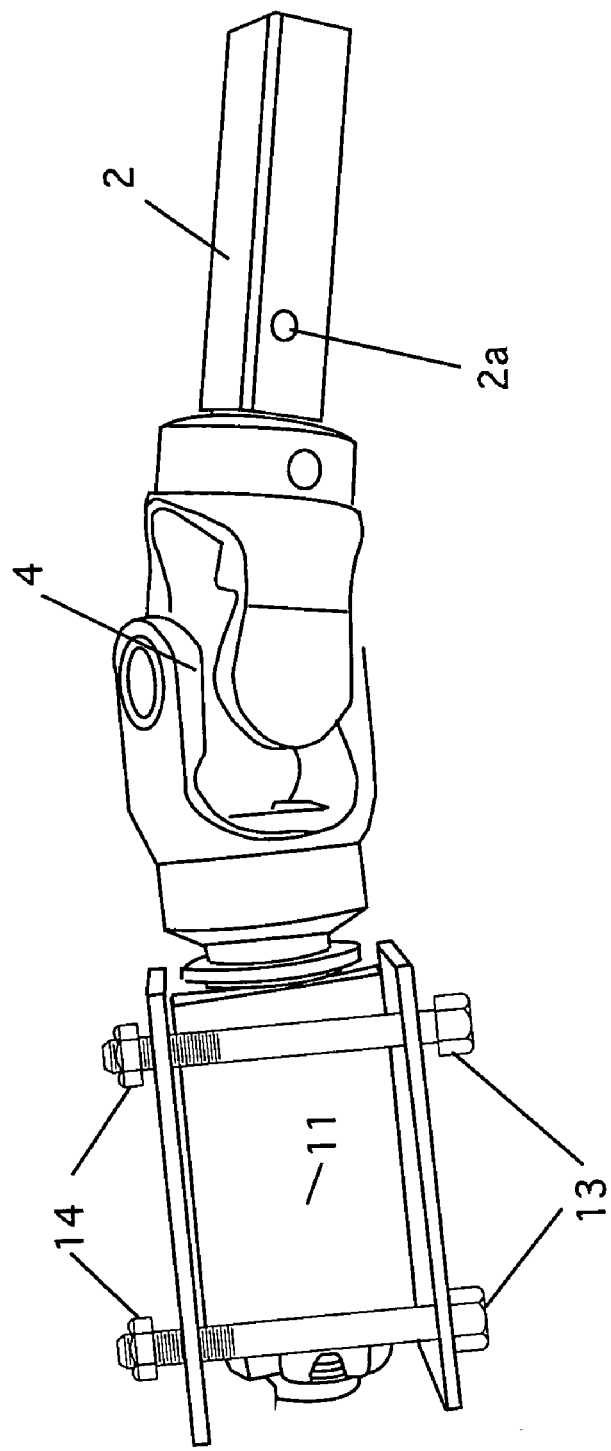
FIG. 5 is a view of the universal joint mechanism with the trailer portion turned ninety degrees.

FIG. 5 is a view of the universal joint mechanism with the trailer portion turned ninety degrees. In this view, the square shaft 2 is shown. Note the hole 2a that is used to secure the shaft in the receiver with pin 3. Note also, in this view, the sleeve is rotated 90 degrees, which shows the bottom of the trailer tongue assembly. Here, the bolts 13 and nuts 14 are shown.

Figure 6:
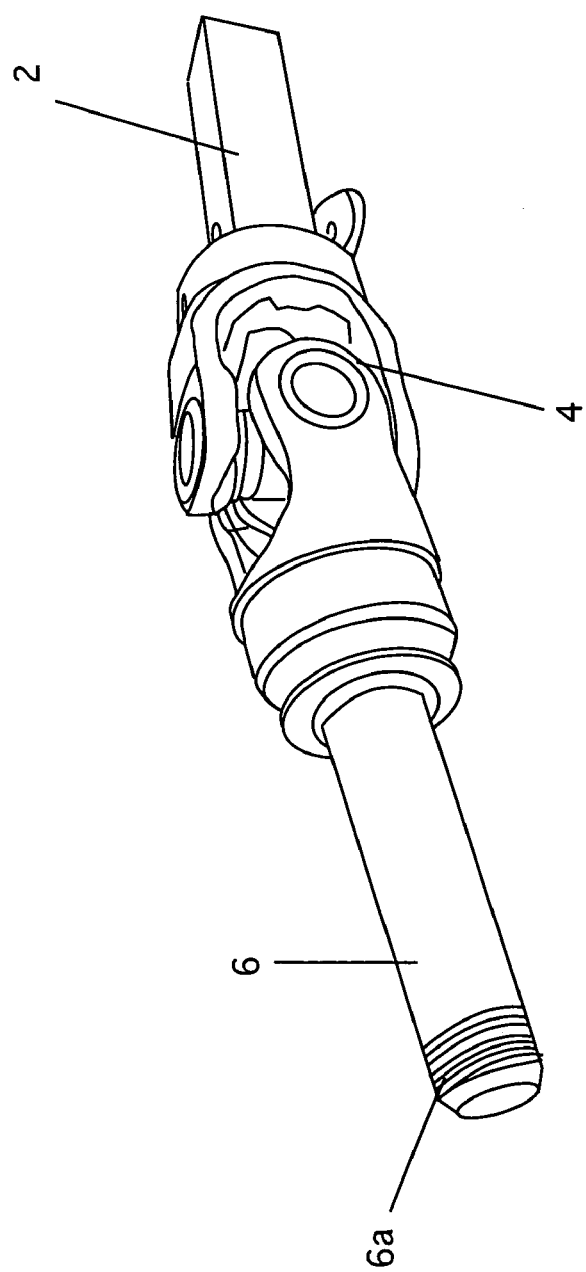
FIG. 6 is a detail view of the universal joint system showing the trailer connector removed.

FIG. 6 is a detail view of the universal joint system showing the trailer connector removed. Here, the spindle 6 is shown outside of the sleeve. Note that the end of the spindle 6 is threaded with threads 6a. The threads are used to secure the end nut 8 to the end of the spindle.

Figure 7:
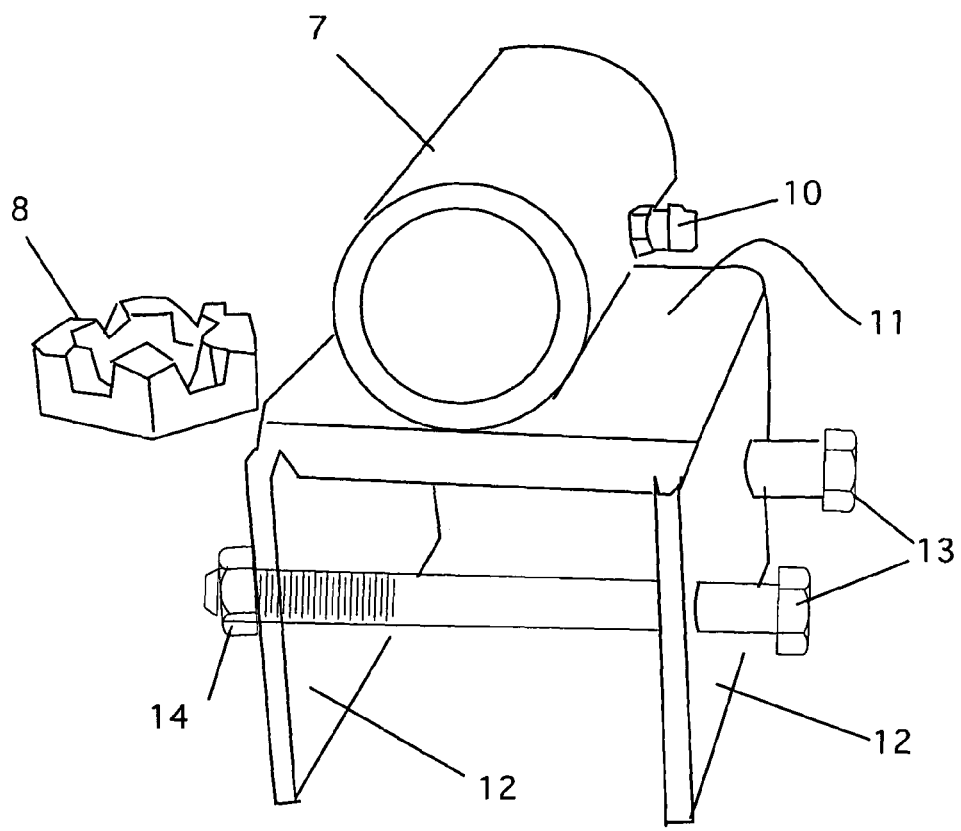
FIG. 7 is a detail view of the trailer connector and the locking nut for the device.

FIG. 7 is a detail view of the trailer connector and the locking nut for the device. In this view, the end nut 8 is shown apart from the device. The sleeve 7 is shown in place, secured to a flat plate 11. The two side plates 12 are also shown along with the bolts 13 and nuts 14. Note also that this figure shows the grease fitting 10.

Figure 8:
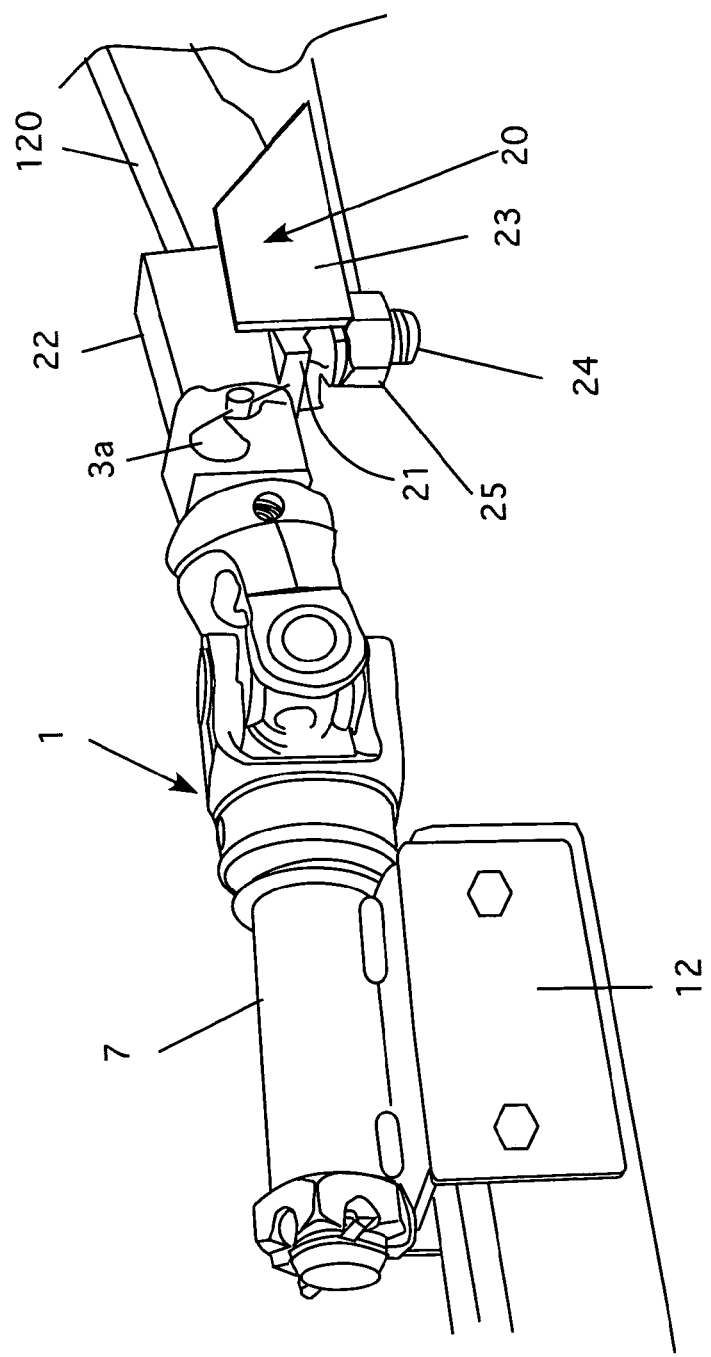
FIG. 8 is a right side view of the device mounted on a trailer and installed using an adapter to attach it to an ATV.

FIG. 8 is a right side view of the device mounted on a trailer and installed using an adapter to attach it to an ATV. While the box receiver system is used in the preferred embodiment, older model ATVs often do not use receivers. Instead, the frame has a flat shelf portion 120 that has a mounting hole for a standard ball for use with a hitch. In these cases, an adapter can be used to attach the coupler to the ATV. FIG. 8 shows one such adapter. Note that the coupler is identical to that described above. However, at the far right end of the figure, the shaft 2 is placed in the adapter. The adapter 20 has a plate 21 onto which a box receiver 22 is mounted. The box receiver accepts the shaft 2 as before. Again, the shaft is secured in this receiver with a pin 3 and clip 3a. The adapter has two side flanges 23 that fit against the frame of the ATV. The side flanges keep the adapter from moving laterally under load. Thus, the side flanges act as a means for restraining lateral movement of said adapter receiver box. The adaptor also has a threaded rod 24 that fits into the mounting hole for the ball. This rod is secured with a nut 25. In this way, the adaptor is attached to the frame is the same way a standard ball is attached.

Figure 9:
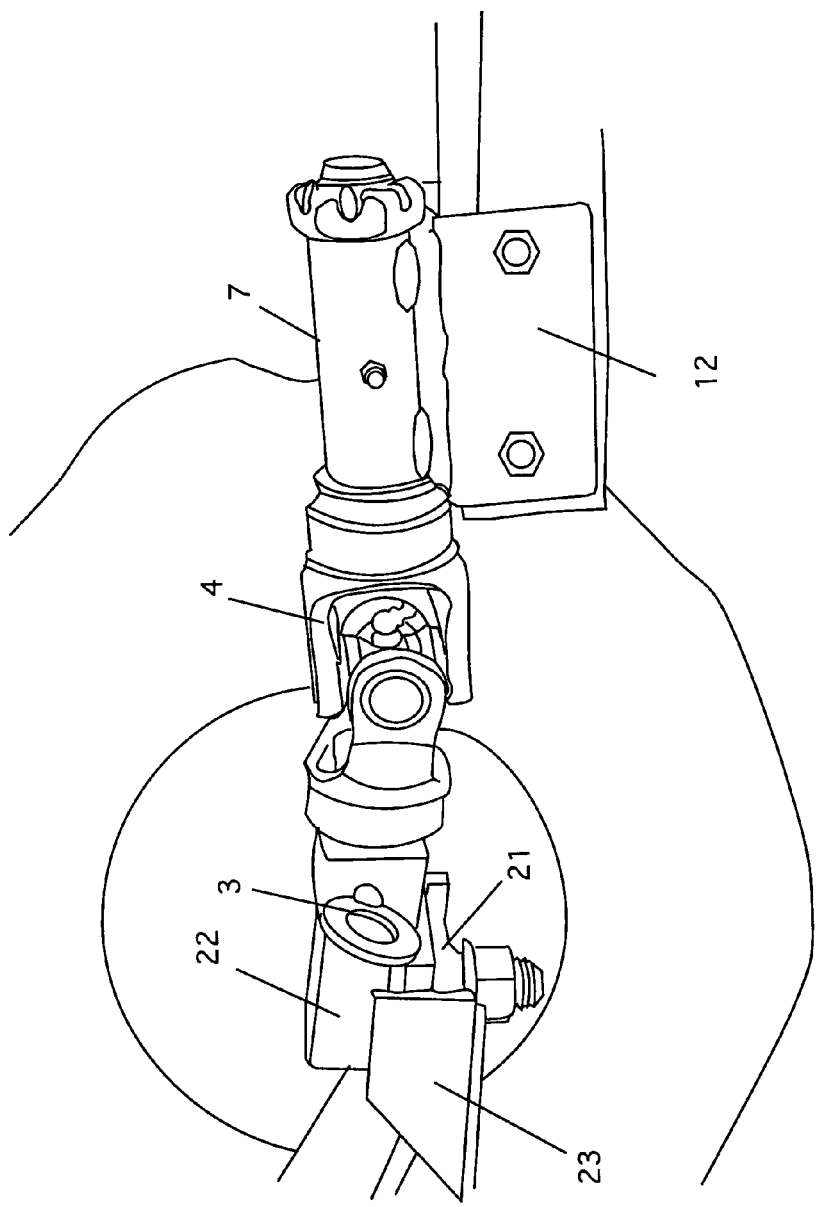
FIG. 9 is a left side view of the device mounted on a trailer and installed using an adapter to attach it to an ATV.

FIG. 9 is a left side view of the device mounted on a trailer and installed using an adapter to attach it to an ATV. This figure shows the adapter from the opposite side from FIG. 9. Here, the plate 21 is clearly shown. As well as the flange 23 and rod and nut.

Figure 10:
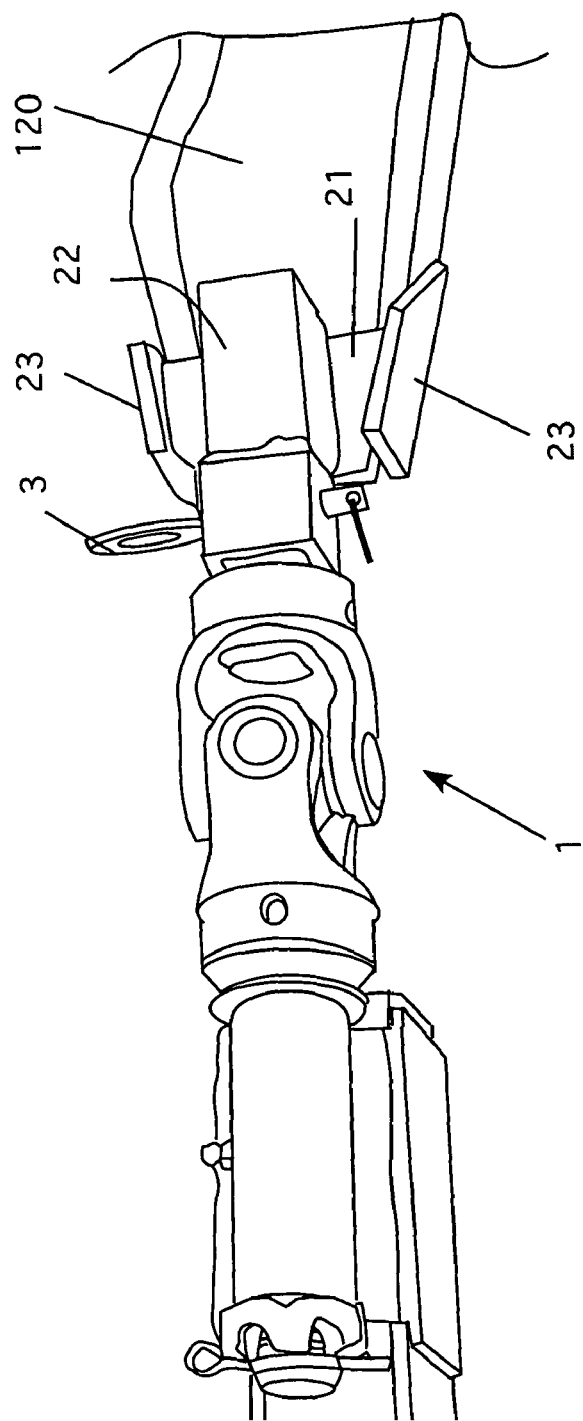
FIG. 10 is a right side top view of the device mounted on a trailer and installed using an adapter to attach it to an ATV.

FIG. 10 is a right side top view of the device mounted on a trailer and installed using an adapter to attach it to an ATV. Here, the pin 3 and clip 3a are shown. Note, also, that the flat plate 21 and the side flanges 23 are shown. This figures shows how the side flanges are formed to fit against the hitch plate 120. This adapter is designed to fit one particular type of ATV. For other ATVs, the adaptor must be modified. However, such modifications are well within the scope of one of ordinary skill. The essential components of any adapter are a means of attaching the adaptor to the hitch plate, which is typically a threaded rod and nut, some means to restrain the adapter from lateral movement, such as side flanges, and a receiver box, to hold the coupler shaft. Thus, the final appearance of the hitch plate depends upon the actual shape of the specific hitch plate. All of these items can be considered to be a means for attaching said adapter receiver box to said frame member for receiving a hitch ball.

Figure 11:
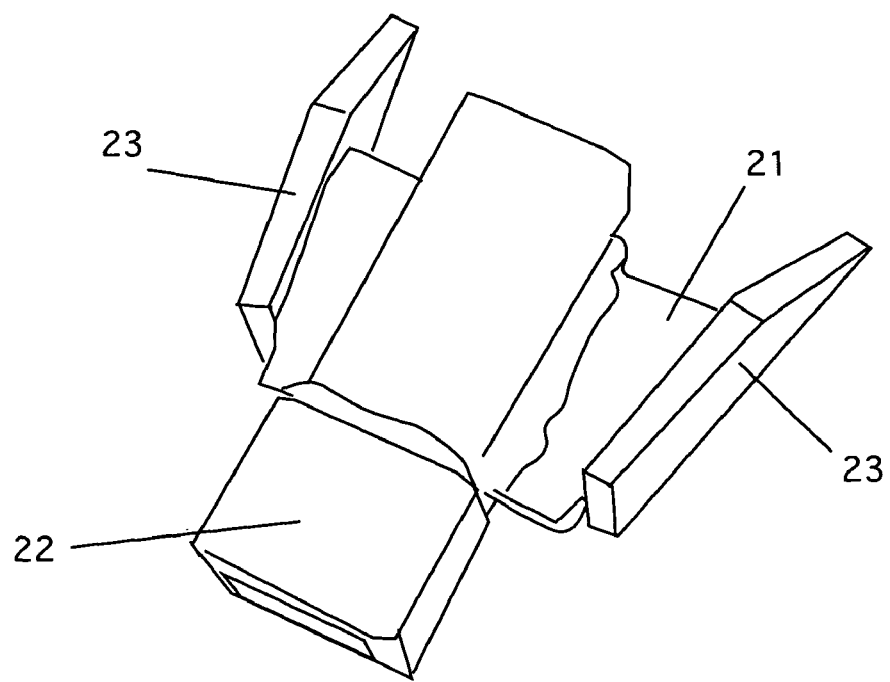
FIG. 11 is a top perspective view of the adapter.

FIG. 11 is a top perspective view of the adapter. Here, the receiver box 22, the flat plate 21, and the side flanges 23 are shown.

Figure 12:
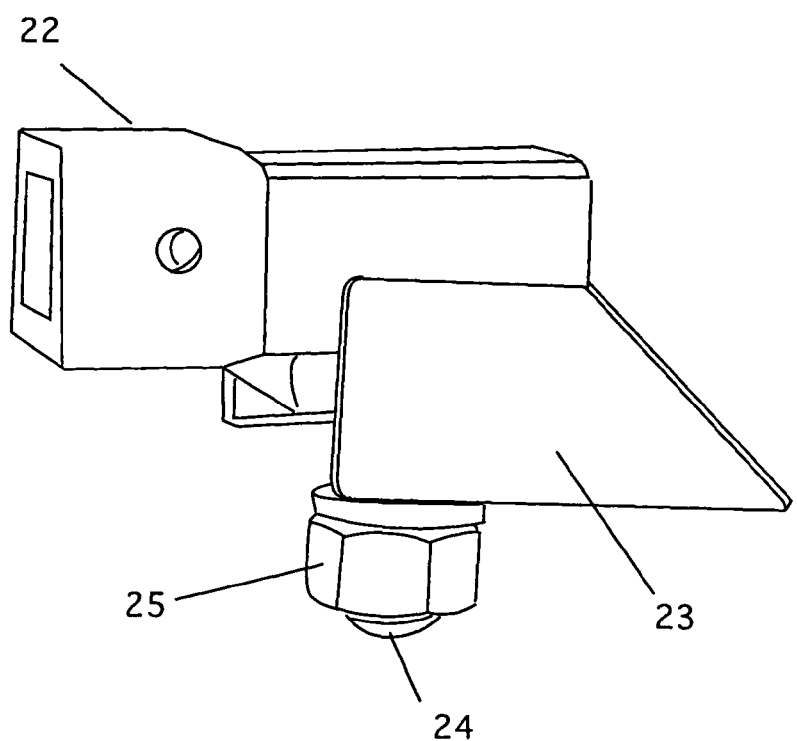
FIG. 12 is a right side perspective view of the adapter.
Figure 13:
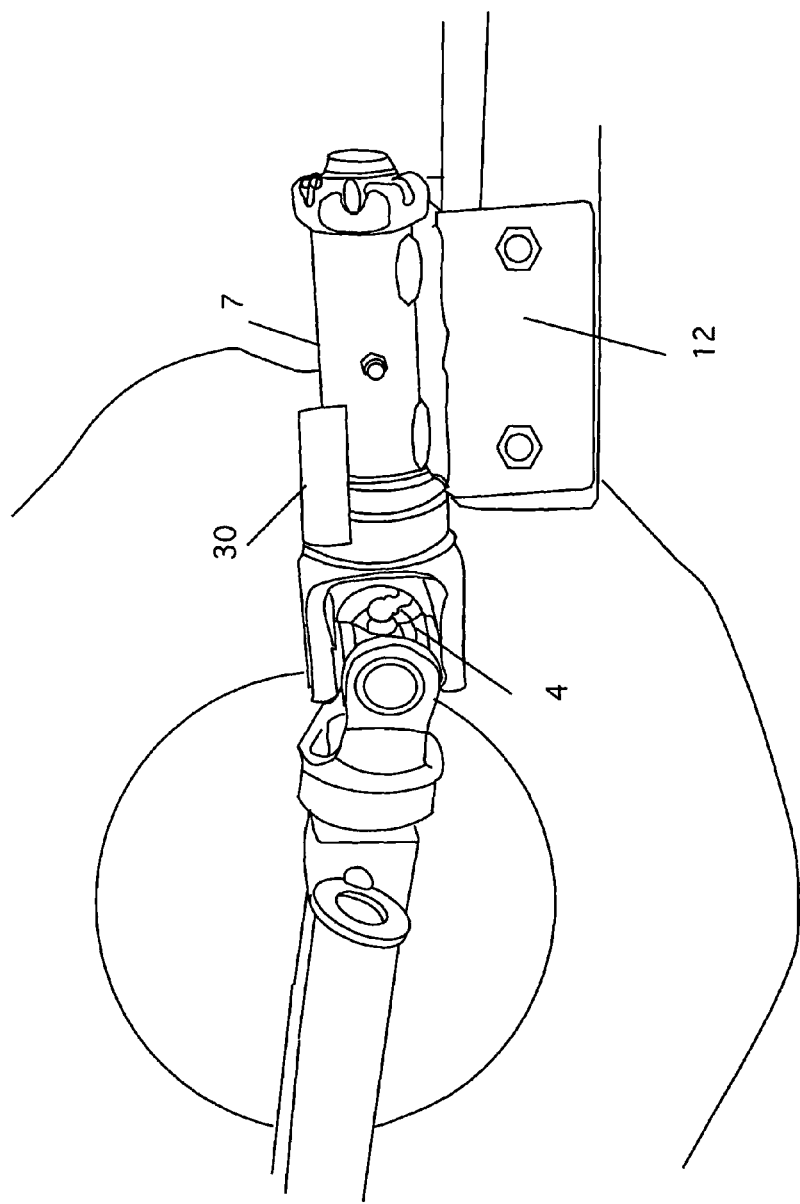
FIG. 13 is a side view of the device showing the rotational inhibitor installed.
Figure 14:
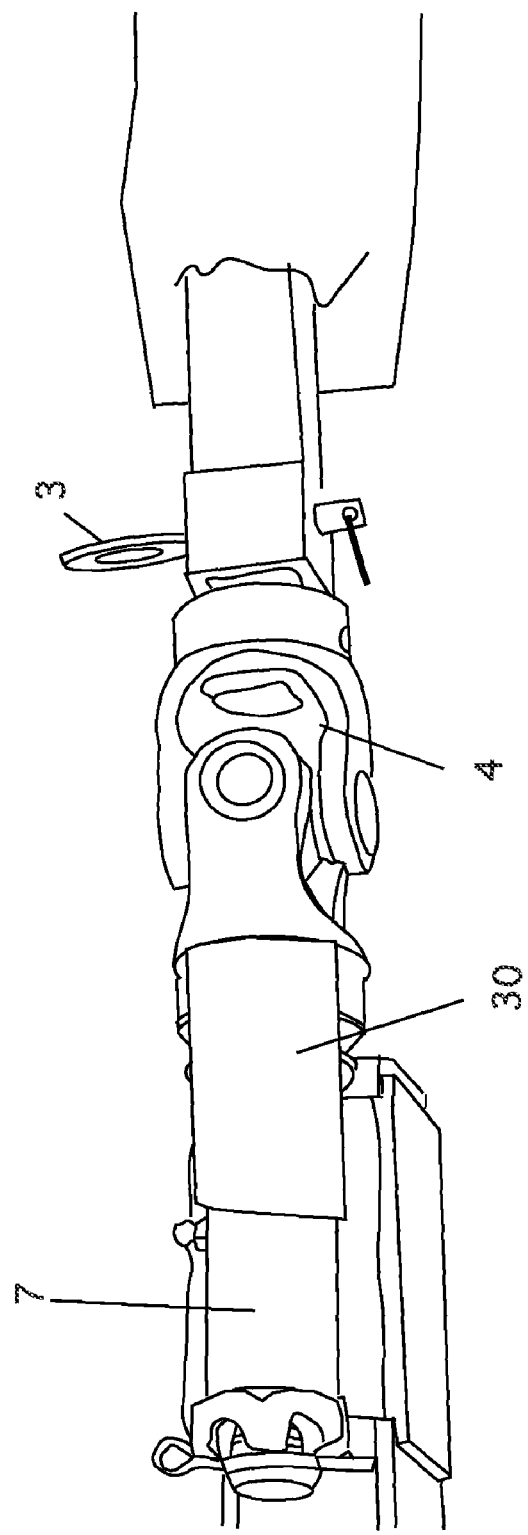
FIG. 14 is a top view of the device showing the rotational inhibitor installed.

FIG. 12 is a right side perspective view of the adapter. Once again, the receiver box 22, the side flange 23, the rod 24 and nut 25 are shown As noted above, many users may not wish to have full 360-degree rotation for their trailers. Such rotation may cause contents to spill, for example. Therefore, a limiter can be installed to limit the amount of rotation. FIG. 13 is a side view of the device showing the rotational inhibitor installed and FIG. 14 is a top view of the device showing the rotational inhibitor installed. In these figures, the coupler is shown as before. The limiter 30 is shown installed at the back of the rear universal arm. This limiter is considered to be a means for limiting the rotation of a trailer about a longitudinal axis of the universal joint mechanism. It rests on top of the sleeve 7. Once the limiter is installed, if the rotation of the universal joint exceeds the desired amount, the limiter contacts one of the two side plates 12. Then, the limiter will cause the trailer to stop further rotation. Similarly, if the trailer begins to rotate about the spindle, it will do so until one of the side plates contacts the limiter. In this way, the rotation of the trailer around the axis of the spindle is also controlled.

The present disclosure should not be construed in any limited sense other than that limited by the scope of the claims having regard to the teachings herein and the prior art being apparent with the preferred form of the invention disclosed herein and which reveals details of structure of a preferred form necessary for a better understanding of the invention and may be subject to change by skilled persons within the scope of the invention without departing from the concept thereof.

I claim:

1. A coupler for trailers for use with an all terrain vehicle, or the like, having a box hitch receiver installed thereon, comprising:
   a) a universal joint mechanism having a first end and a second end;
   b) a shaft, attached to the first end of the universal joint and extending outwardly therefrom, said shaft being sized to fit into the box hitch receiver on said all terrain vehicle;
   c) a means for temporarily securing and retaining said shaft in said box hitch receiver;
   d) a spindle, attached to the second end of said universal joint and extending outwardly therefrom, said spindle having distal end and further wherein said distal end has a plurality of threads formed thereon;
   e) a sleeve, slidably placed onto said spindle such that said spindle is rotatably fitted within said sleeve;
   f) a means for securing said sleeve onto said spindle; and
   g) a means for attaching said sleeve to a tongue of a trailer, fixedly attached to said sleeve wherein said means for attaching comprise:
   i) a flat bottom plate, fixedly attached to said sleeve;
   ii) a pair of oppositely disposed side plates, attached to said flat bottom plate and extending downward therefrom; and
   iii) at least one fastener to attach said pair of oppositely disposed side plates to said tongue of said trailer.

2. The coupler of claim 1 wherein the means for temporarily securing and retaining said shaft in said box hitch receiver comprises a pin having a spring clip thereon.

3. The coupler of claim 1 wherein the means for securing said sleeve onto said spindle comprises a nut, attached to said plurality of threads on said spindle.

4. The coupler of claim 1 wherein the universal joint mechanism further includes a grease fitting.

5. The coupler of claim 1 wherein the sleeve further includes a grease fitting.

6. The coupler of claim 3 wherein the spindle further includes a hole, passing through said spindle such that when said nut is in place, said hole is positioned to permit a pin to pass through said spindle to secure said nut; and a pin, to secure said nut on said spindle.

7. The coupler of claim 1 further comprising:
   a) a means for limiting the rotation of a trailer about a longitudinal axis of the universal joint mechanism, said means for limiting being attached to said universal joint mechanism and further being positioned to operatively contact said means for attaching said sleeve to a tongue of a trailer.

8. A coupler for trailers for use with an all terrain vehicle, or the like, having a frame member for receiving a hitch ball installed thereon, comprising:
   a) a universal joint mechanism having a first end and a second end;
   b) a shaft, attached to the first end of the universal joint and extending outwardly therefrom;
   c) a spindle, attached to the second end of said universal joint and extending outwardly therefrom, said spindle having distal end and further wherein said distal end has a plurality of threads formed thereon;
   d) a sleeve, slidably placed onto said spindle such that said spindle is rotatably fitted within said sleeve;
   e) a means for securing said sleeve onto said spindle;
   f) a means for attaching said sleeve to a tongue of a trailer, fixedly attached to said sleeve, including:
   i) a flat bottom plate, fixedly attached to said sleeve;
   ii) a pair of oppositely disposed side plates, attached to said flat bottom plate and extending downward therefrom; and
   iii) at least one fastener to attach said pair of oppositely disposed side plates to said tongue of said trailer;
   g) an adapter receiver box, including:
   i) a box portion for receiving said shaft; and
   ii) a means for attaching said adapter receiver box to said frame member for receiving a hitch ball; and
   h) a means for temporarily securing and retaining said shaft in said box portion.

9. The coupler of claim 8 wherein the means for temporarily securing and retaining said shaft in said box portion comprises a pin having a spring clip thereon.

10. The coupler of claim 8 wherein the means for securing said sleeve onto said spindle comprises a nut, attached to said plurality of threads on said spindle.

11. The coupler of claim 8 wherein the universal joint mechanism further includes a grease fitting.

12. The coupler of claim 8 wherein the sleeve further includes a grease fitting.

13. The coupler of claim 10 wherein the spindle further includes a hole, passing through said spindle such that when said nut is in place, said hole is positioned to permit a pin to pass through said spindle to secure said nut; and a pin, to secure said nut on said spindle.

14. The coupler of claim 8 further comprising:
   a) a means for limiting the rotation of a trailer about a longitudinal axis of the universal joint mechanism, said means for limiting being attached to said universal joint mechanism and further being positioned to operatively contact said means for attaching said sleeve to a tongue of a trailer.

15. The coupler of claim 8 wherein the means for attaching said adapter receiver box to said frame member for receiving a hitch ball comprises:
   a) a threaded rod extending downward from said adapter receiver box; and
   b) a nut, secured to said threaded rod, such that said adapter receiver box is secured to said frame member for receiving a hitch ball.

16. The coupler of claim 8 wherein the adapter receiver box further includes a means for restraining lateral movement of said adapter receiver box fixedly attached to said adapter receiver box.

17. The coupler of claim 16 wherein the means for restraining lateral movement of said adapter receiver box comprise a pair of oppositely disposed flanges attached to said adapter receiver box such that said pair of flanges contacts said frame member for receiving a hitch ball to hold said adapter receiver box in a relatively fixed position with respect to said frame member for receiving a hitch ball.

* * * * *